United States Patent [19]

Metti

[11] Patent Number: 4,796,165
[45] Date of Patent: Jan. 3, 1989

[54] VEHICLE TAIL LIGHT CONSTRUCTION
[75] Inventor: Robert H. Metti, Livonia, Mich.
[73] Assignee: Chrysler Motors Corporation, Highland Park, Mich.
[21] Appl. No.: 170,204
[22] Filed: Mar. 18, 1988
[51] Int. Cl.$^4$ .............................................. B60Q 1/22
[52] U.S. Cl. ..................................... 362/80; 362/61; 362/455
[58] Field of Search ............... 362/61, 80, 78, 255, 362/256, 267, 367, 374, 375, 455, 456; 296/1 C, 195, 187

[56] References Cited
U.S. PATENT DOCUMENTS

| | | | |
|---|---|---|---|
| 4,251,103 | 2/1981 | Nakajima et al. | 362/61 |
| 4,532,577 | 7/1985 | Shelton | 362/80 |
| 4,532,578 | 7/1985 | Gaden et al. | 362/80 |
| 4,679,125 | 7/1987 | Dick | 362/80 |

Primary Examiner—Ira S. Lazarus
Assistant Examiner—Sue Hagarman
Attorney, Agent, or Firm—Edward A. Craig

[57] ABSTRACT

A tail light assembly is provided for a vehicle body. The tail light assembly is secured to the vehicle body by threaded fasteners which extend from a point externally of the vehicle body through openings in the tail light assembly into threaded engagement with body structure. The threaded fasteners are obscured from external view by of a cover plate which is secured to the tail light assembly over the threaded fasteners. The cover plate is also secured to the tail light assembly by threaded fastener structure. However, this threaded fastener structure extends from a point within the opening provided for a deck lid and is hidden from external view when the deck lid is closed.

3 Claims, 4 Drawing Sheets

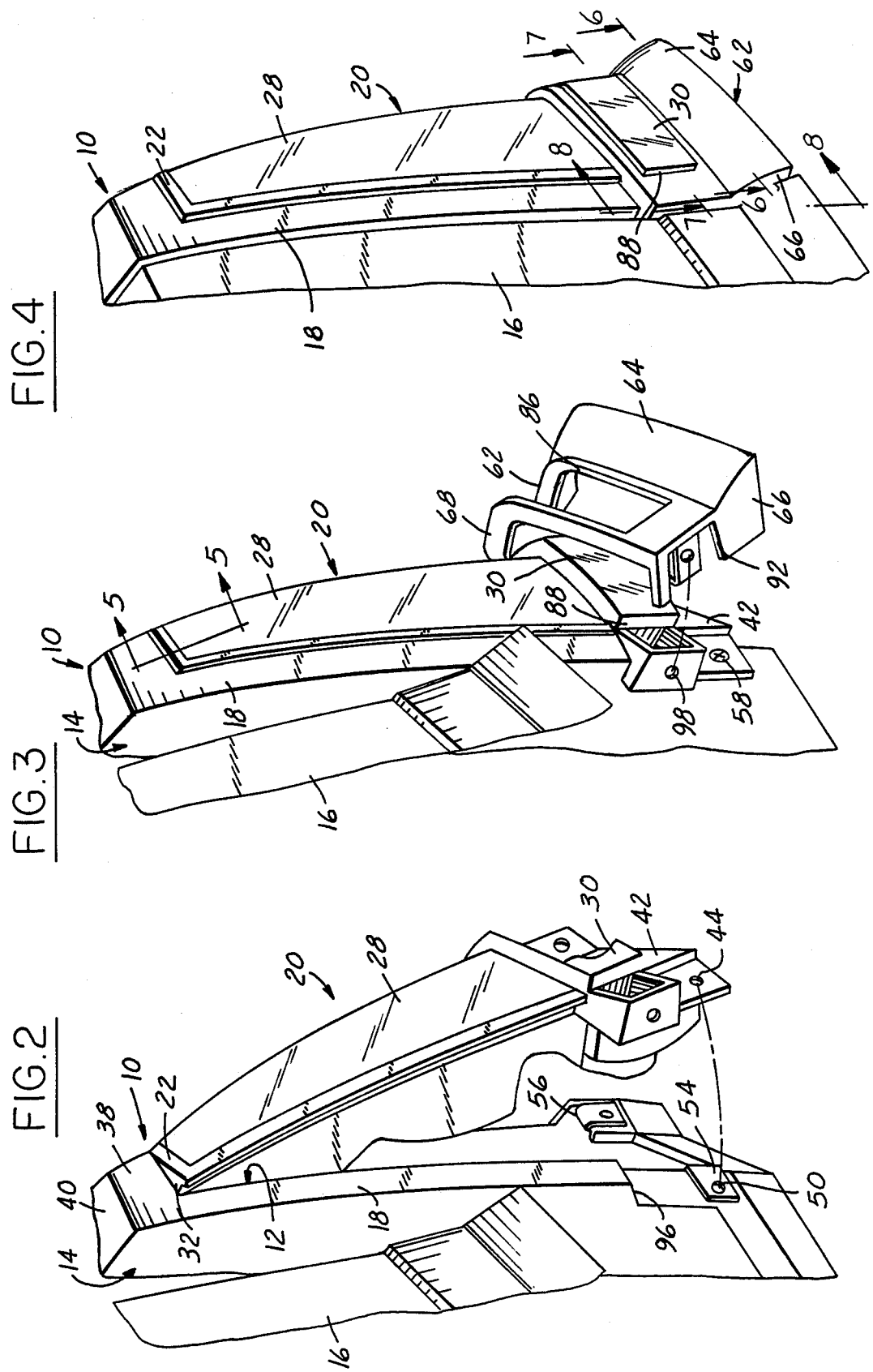

VEHICLE TAIL LIGHT CONSTRUCTION

BACKGROUND OF THE INVENTION

1. Field of the Invention

A tail light construction is secured to a vehicle body by means of thredded fasteners. The construction includes means for hiding the heads of the threaded fasteners from external view.

2. Prior Art

In modern car construction, it is desired to hide the heads of any screws which are used to attach tail light assemblies to a vehicle. It is considered aesthetically undesirable to have externally visible fasteners on the exterior of vehicles. One technique which has been used in the past to attach the tail light assemblies in place without the fasteners being externally visible has been to provide interior screws which are set from inside the space behind the tail light assembly. However, in some vehicle designs, it is either impossible or very inconvenient or expensive to provide for such interior screw mounting.

In the present invention, means have been provided for first fastening the tail light assembly to a vehicle using fastening means which are initially externally visible. A cover plate is provided which is then latched on one side to the tail light assembly and screwed into the tail light assembly from the other side. However, the screw means are not visible from the exterior of the vehicle because they extend from the deck lid opening into the tail light assembly. When the deck lid is closed, the heads of screws cannot be seen. Thus, a relatively inexpensive technique has been provided for achieving the desired end of making the fastening devices not externally visible while avoiding the necessity for setting screw means from a point behind the tail light assembly.

SUMMARY OF THE INVENTION

The combination of the present invention comprises a vehicle body having a tail light opening and a deck lid opening which is adjacent thereto. A deck lid is mounted on the vehicle body over the deck lid opening. The deck lid is adapted to swing to open and closed positions with respect to the deck lid opening. A partition is provided between a tail light opening and the deck lid opening. The partition defines an inboard wall of the tail light opening and an outboard wall of the deck lid opening. The deck lid obscurss the adjacent surface of the partition when it is in the closed position and permits access to the surface when it is in the open position.

A tail light assembly is received in the tail light opening. The tail light opening has an upper wall. Latch structure is provided on this upper wall. Cooperating latch structure is provided on the upper end of the tail light assembly in latching engagement therewith.

The tail light assembly has a lower wall with opening means therein. The tail light opening has a lower wall with mating opening means therein. Threaded fastening means pass through the opening means in the lower wall of the tail light assembly into threaded engagement into the opening means in the lower wall of the tail light opening.

A cover plate is provided. The cover plate has a generally C-shaped cross section including an outer wall, an inboard wall and an outboard wall. The plate is received on the lower portion of the tail light assembly with the outer wall thereof obscuring the threaded fastening means on the lower wall of the tail lgght assembly. The tail light assembly has a lower outboard wall. Latch structure is provided on this lower outboard wall. Cooperating latch structure is provided on the outboard wall of the cover plate in latching engagement therewith.

The cover plate inboard wall has opening means therein. The partition has opening means on the lower portion thereof. The tail light assembly has an inboard wall portion on the lower portion hhereof located at the opening means in the lower portion of the partition. The cover plate on the inboard wall overlaps the inboard wall portion on the lower portion of the tail light assembly. These wall structures have mating opening means therein. Threaded fastening means pass from the deck lid opening into threaded engagement therewith to secure the cover plate to the tail light assembly. These threaded fastening means are obscured when the deck lid in the closed position and are accessible when the deck lid is in the open position.

Preferably, the latch structure provided on the lower outboard wall of the tail light assembly comprises an elongated vertically extending lip facing in the outboard direction. The cooperating latch structure provided on the outboard wall of the cover plate comprises a mating elongated vertically extending lip facing in the inboard direction and in abutting relationship with the inner surface of the tail light assembly lip. Rib structure is provided at the upper and lower ends of the lip on the outboard wall of the cover plate in abutment with the upper and lower ends of the tail light assembly lip to position the cover plate with respect to the tail light assembly. The outer and outboard walls of the cover plate have a continuous opening therein. The tail light assembly has a lens positioned in this opening and extending partially therethrough. The portion of the lens extending through the opening abuts against the edges of the opening thereby requiring pivoting of the cover plate about the latching lips for removal of the cover plate from the tail light assembly.

IN THE DRAWINGS

FIG. 2 is a view in perspective illustrating the initial attachment of the tail light assembly to the vehicle body;

FIG. 3 is a view in perspective similar to FIG. 2 illustrating mounting of the cover plate on the tail light assembly;

FIG. 4 is a view in perspective illustrating complete mounting of the tail light assembly;

DETAILED DESCRIPTION OF A PREFERRED EMBODIMENT

Figure 1:
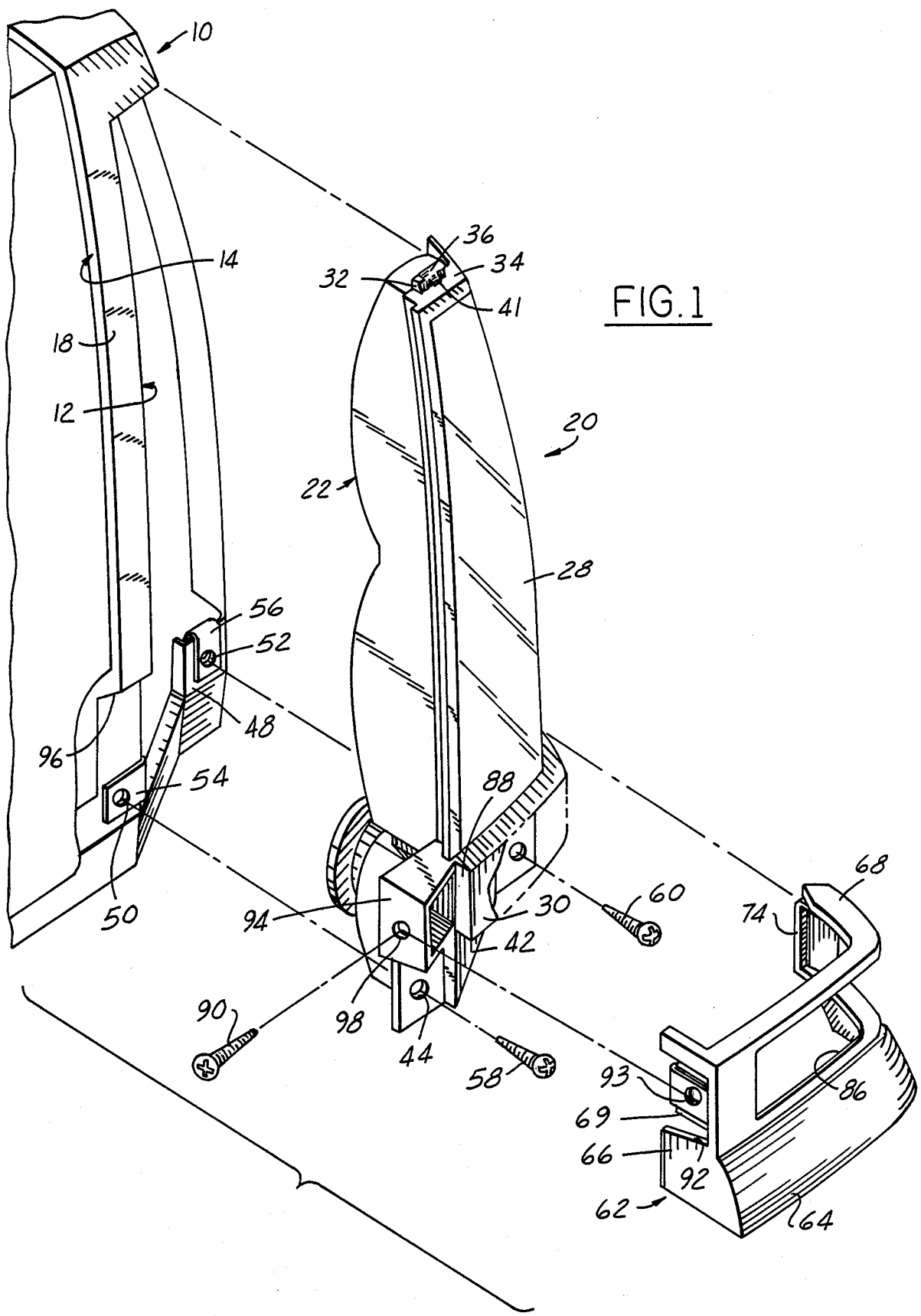
FIG. 1 is an exploded perspective view of a tail light assembly and a portion of a vehicle body to which the tail light assembly is secured forming one embodiment of the present invention.
Figure 5:
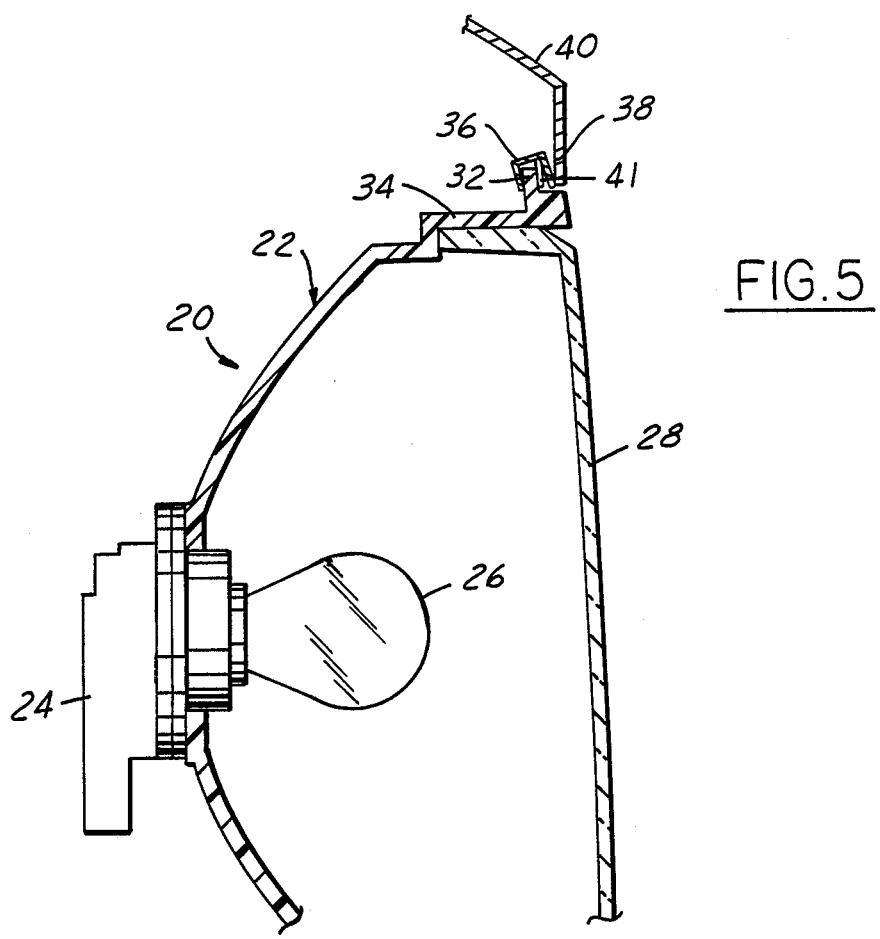
FIG. 5 is a sectional view taken substantially along the line 5—5 of FIG. 3 looking in the direction of the arrows.
Figure 6:
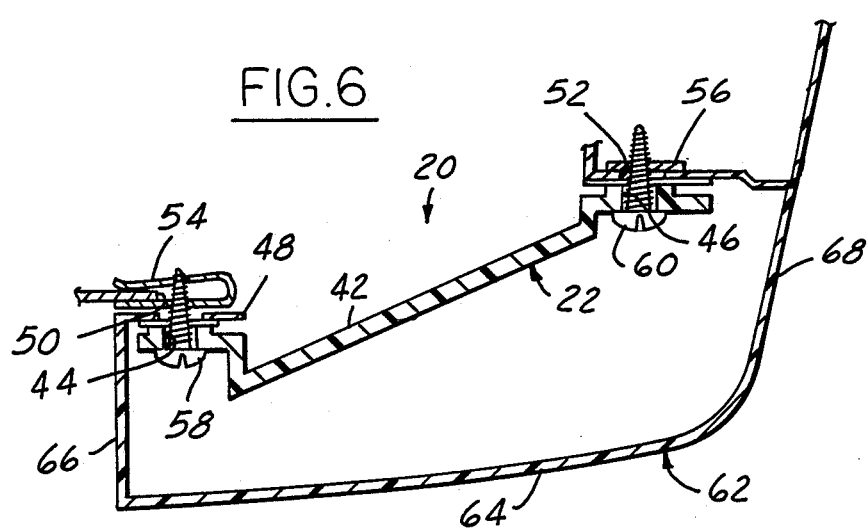
FIG. 6 is a sectional view taken substantially along the line 6—6 of FIG. 4 looking in the direction of the arrows.

Referring to FIG. 1, it will be noted that a vehicle body 10, representively the right rear section, has a tail light opening 12 and a deck lid opening 14 adjacent thereto. A conventional deck lid 16 is mounted on the vehicle body 10 and covers the deck lid opening 14 when it is closed. Conventionally, deck lids are mounted on vehicle bodies by means of hinges. The deck lid 16 is adapted to swing to an open position as shown in FIG. 2 and to a closed position as shown in FIG. 4.

A partition 18 is provided between the tail light opennng 12 and the deck lid opening 14. The partition 18 defines an inboard wall of the tail light opening 12 and an outboard wall of the deck lid opening 14. The term "inboard" is used to refer to a position or direction towards the longitudinal center of the vehicle body while the term "outboard" is used to refer to a direction or position towards the outer sides of the vehicle body. Similarly, the term "outer" is used to refer to a position or direction towards the rear of the vehicle, which the term "inner" is used to refer to a position or direction towards the front of the vehicle. As will be noted in FIG. 4, the deck lid 16 obscures the adjacent surface of the partition 18 when the deck lid is in the closed position and, as will be noted in FIGS. 2 and 3, the deck lid permits access to this surface when it is an open position.

A tail light assembly 20 is received in the tail light opening 12. The tail light assembly 20 is a vertically elongated member comprising a housing 22 into which project a plurality of bulb sockets 24 which carry bulbs 26. The sockets 24 are secured to the vehicle body. An elongated lens 28 is provided on the exterior of the housing 22. The lens 28 is, in the present case, a red lens which is used to indicate braking and turning. A clear lens 30 is provided on the housing 22 beneath the lens 28. This lens is designed to emanate a white light associated with backing up of the vehicle.

The tail light assembly 20 is received in the tail light opening 12. The tail light assembly is latched to the vehicle body at its upper end. This is accomplished by means of a latching mechanism which comprises a lip 32 provided on upper wall 34 of the tail light assembly. A sprigg 36 is provided on lip 32. The lip 32 and spring 36 are inserted to a point adjacent to a lip 38 provided on the upper wall 40 of the tail light opening 12. As will be noted in FIG. 2, it is only necessary to insert the lip 32 in place and then swing the tail light assembly 20 towards the vehicle body. The tail light assembly is then partially secured within the tail light opening 12 with spring arm 41 catching the lower end of lip 38. The tail light assembly has a lower wall 42 with opening means consisting of a pair of openings 44, 46. The tail light opening 12 has a lower wall 48 with mating openings 50, 52 therein. Thread engageable structures 54, 56 have mating openings overlying openings 50, 52. Self-threading screws 58, 60 pass through the openings 44, 46 in the lower wall 42 of the tail light assembly into threaded engagement with the structures 54, 56 to thereby secure the tail light assembly 20 firmly onto the vehicle body 10.

A cover plate 62 is provided for securement to the lower end of the tail light assembly 20. The cover plate 62 has a generally C-shaped cross section including an outer wall 64, an inboard wall 66 and an outboard wall 68. The cover plate 62 is received on the lower portion of the tail light assembly 12 with the outer wall 64 obscuring the threaded fastening means which comprise the screws 58, 60 on the lower wall 42 of the tail light assembly 20.

Figure 7:
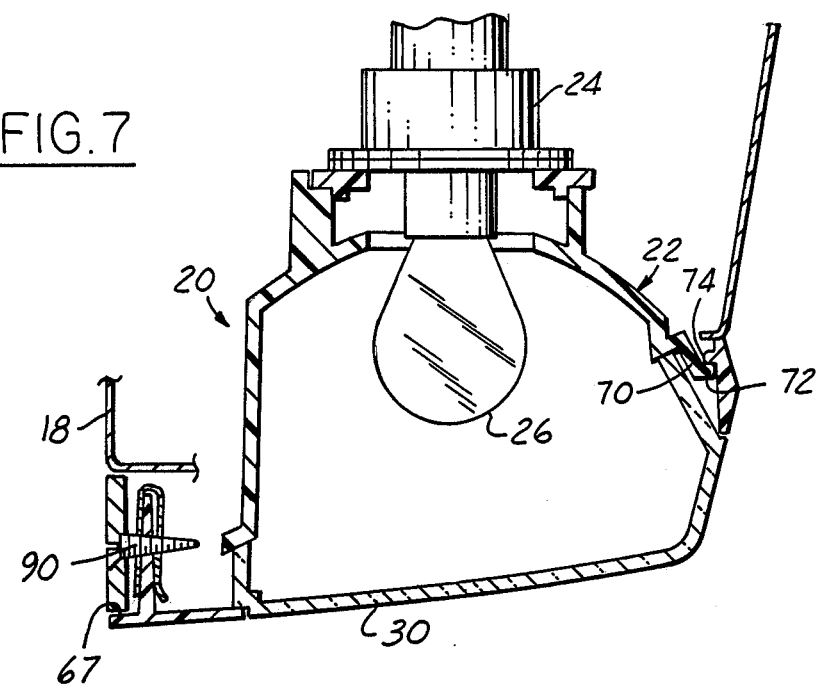
FIG. 7 is a sectional view taken substantially along the line 7—7 of FIG. 4 looking in the direction of the arrows.
Figure 8:
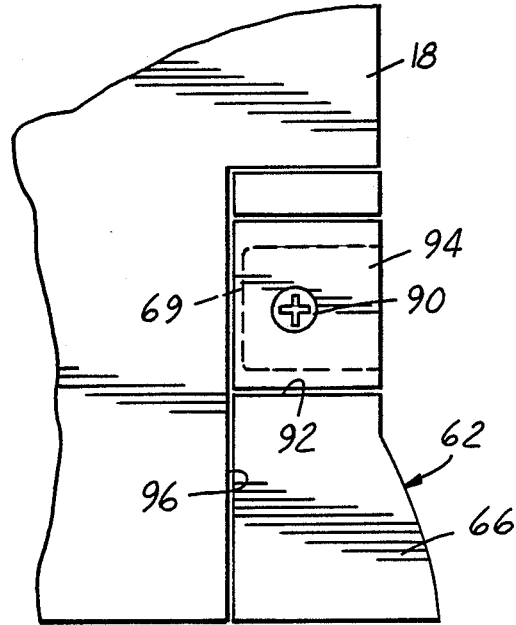
FIG. 8 is a sectional view taken substantially along the line 8—8 of FIG. 4 looking in the direction of the arrows.
Figure 9:
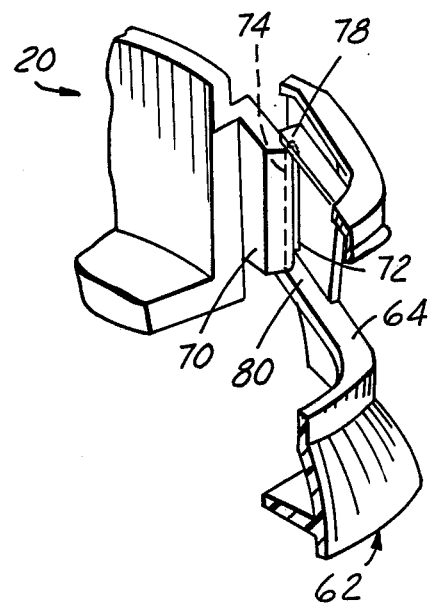
FIG. 9 is a perspective view illustrating the cooperative latch structure of the tail light assembly and cover plate therefor.

The cover plate 62 is secured to the tail light assembly 12 by means of latching structure and a threaded fastener. As will be noted in FIGS. 7 and 9, the tail light assembly 20 has a lower outboard wall 70. Latch structure is provided on the outboard wall 70. The latch structure comprises an elongated vertically extended lip 72 which faces in the outboard direction. Cooperating latch structure is provided on the outboard wall 68 of the cover plate 62. This latch structure comprises a mating elongated vertically extending lip 74 which faces in the inboard direction. As will be noted in FIGS. 7 and 9, the lip 74 is placed outboard of the lip 72 in abutting relationship with the inner or forward surface of the tail light assembly lip 72.

A rib structure comprising ribs 78, 80 are provided at the upper and lower ends of the lip 74. These ribs are in abutment with the upper and lower ends 82, 84 of the tail light assembly lip 72 to position the cover plate 62 vertically with respect to the tail light assembly 12. This assures proper orientation of the cover plate 62.

The cover plate 62 is then swung towards the tail light assembly 20 as illustrated in FIG. 3. This is done with the deck lid 16 in the open position. The outer and oubboard walls 64, 68 of the cover plate 62 have a continuous opening 86 therein. The lower tail light lens 30 is positioned in the opening 86 when the cover plate 62 is swung onto the tail light assembly 20. A portion of the lens 30 extends through the opening 86 and abuts against the edges defining the opening 86. This arrangement prevents vertical or horizontal movement of the cover plate 62 with respect to the tail light assembyy 20 thus firmly placing the cover plate 62 in proper position with respect to the tail light assembly. Of particular importance in this respect is the inboard surface 88 of the lens 30. It is necessary to pivot the cover plate 62 in order to remove it or install it on the tail light assembly 20. When the cover plate 62 is pivoted, it clears the lens 30 thus permitting removal or installation of the cover plate 62.

After the cover plate 62 is mounted on the tail light assembly 20, it is secured in place by means of a self-threading screw 90. The cover plate inboard wall 66 has an opening 92 therein. The tail light assembly 20 has an inboard wall portion 94 on the lower portion thereof. The partition 18 has an opening 96 on the lower portion thereof. The inboard wall portion 94 of the tail light assembly is located at the opening means 96 in the lower portion of the partition 18. The cover plate inboard wall opening 92 surrounds the inboard wall portion 94. A tab 69 is provided on the wall 66 inset therefrom. The tab 69 is positioned behind the wall portion 94. An opening 98 provided in the wall portion 94 and mates with an opening 93 in tab 69. A screw receiving structure 100 is received on tab 69 and has opening means therein for reception of the screw 90. The screw 90 passes from the deck lid opening 14 into engagement therewith to secure the cover plate 62 to the tail light assembly 20. As will be noted in FIG. 4, when the deck lid 16 is in the closed position, the screw 90 is obscured from external view. However, the screw 90 is accessible when the deck lid 16 is opened to permit removal of the tail light assembly for servicing.

I claim:

1. The combination comprising a vehicle body having a tail light opening and a deck lid opening adjacent thereto, a deck lid mounted on the vehicle body over the deck lid opening and adapted to swing to open and closed positions with respect to the deck lid opening, a partition between the tail light opening and the deck lid opening defining an inboard wall of the tail light opening and an outboard wall of the deck lid opening, the deck lid obscuring the adjacent surface of the partition when it is in the closed position and permitting access to said surface when it is in an open position, a tail light assembly received in the tail light opening, the tail light opening having an upper wall, latch structure provided on said upper wall, the tail light assembly having an upper wall, cooperating latch structure provided on the upper end of the tail light assembly in latching engagement with the latch structure of the tail light opening upper wall, the tail light assembly having a lower wall with opening means therein, the tail light opening having a lower wall with mating opening means therein, threaded fastening means passing through the opening means in the lower wall of the tail light sssembly into threaded engagement with the opening means in the lower wall of the tail light opening, a cover plate, the cover plate having a generally C-shaped cross section including an outer wall an inboard wall and an outboard wall, the cover plate being received on the lower portion of the tail light assembly with the outer wall thereof obscuring the threaded fastening means on the lower wall of the tail light assembly, the tail light assembly having a lower outboard wall, latch structure provided on said lower outboard wall, cooperating latch structure provided on the outboard wall of the cover plate in latching engagement therewith, the cover plate inboard wall having opening means therein, said partition having opening means on the lower portion thereof, the tail light assembly having an inboard wall portion on the lower portion thereof located at the opening means in the lower portion of the partition, the cover plate inboard wall having a tab overlapping the inboard wall portion on the lower portion of the tail light assembly, said last mentioned inboard wall structure and tab having mating opening means therein, and threaded fastening means passing from said deck lid opening into threaded engagement therewith to secure the cover plate to the tail light assembly, said last mentioned threaded fastening means being obscured when the deck lid is in the closed position and accessible when the deck lid in the open position as aforesaid.

2. The combination of claim 1, further characterized on that the latch structure provided on the lower outboard wall of the tail light assembly comprises an elongated vertically extending lip facing in the outboard direction, the cooperating latch structure provided on the outboard wall of the cover plate comprising a mating elongated vertically extending lip facing in the inboard direction and in abutting relationship with the inner surface of said tail light assembly lip, and rib structure at the upper and lower ends of the lip on the outboard wall of the cover plate in abutment with the upper and lower ends of said tail light assembly lip to position the cover plate vertically with respect to the tail light assembly.

3. The combination of claim 1, further characterized in that the outer and outboard walls of the cover plate have a continuous opening therein, the tail light assembly having a lens positioned in said last mentioned opening and extending partially therethrough, the portion of the lens extending through said opening abutting against the edges of the opening thereby requiring pivoting of the cover plate about said lips for removal of the cover plate from the tail light assembly.

* * * * *